United States Patent
Shimizu et al.

[11] Patent Number: 5,965,290
[45] Date of Patent: Oct. 12, 1999

[54] NON-AQUEOUS ELECTROLYTE CELL

[75] Inventors: Toshiyuki Shimizu, Sakai; Fumio Daio, Kitakatsuragi-gun; Takeshi Inui, Yao, all of Japan

[73] Assignee: Matsushita Electric Industrial Co., Ltd., Osaka, Japan

[21] Appl. No.: 08/915,512

[22] Filed: Aug. 13, 1997

[51] Int. Cl.$^6$ ........................................... H01M 4/00
[52] U.S. Cl. ............................................. 429/94; 429/211
[58] Field of Search ................... 429/94, 127; 29/623.1, 29/623.3, 623.4

[56] References Cited

U.S. PATENT DOCUMENTS

| | | | |
|---|---|---|---|
| 3,298,871 | 1/1967 | Binder et al. | 429/94 |
| 4,707,421 | 11/1987 | McVeigh, Jr. et al. | 429/94 |
| 5,354,629 | 10/1994 | Kuroda et al. | 429/94 |
| 5,458,993 | 10/1995 | Terao et al. | 429/94 |
| 5,508,122 | 4/1996 | Narukawa et al. | |

FOREIGN PATENT DOCUMENTS

| | | |
|---|---|---|
| 0780920 | 6/1997 | European Pat. Off. . |
| 62-272473 | 11/1987 | Japan . |
| 05013089 | 1/1993 | Japan . |
| 5-13089 | 1/1993 | Japan . |

*Primary Examiner*—Maria Nuzzolillo
*Assistant Examiner*—Susy Tsang
*Attorney, Agent, or Firm*—Jordan and Hamburg LLP

[57] ABSTRACT

A non-aqueous electrolyte cell has an electrode assembly including a negative electrode strip, a positive electrode strip having an active cathode material, and a separator. The positive electrode strip and the negative electrode strip are superposed with the separator therebetween and wound in a spiral. The negative electrode strip is disposed outside the positive electrode strip and has an outermost winding, a negative electrode strip winding end, and a penultimate winding. The positive electrode strip has an outermost winding terminating at a positive electrode strip winding end. An anode current collector contacts the negative electrode strip on the penultimate winding and is radially aligned with a portion of the outermost winding of the positive electrode strip. Insulating tape is bonded to an inside surface and an outside surface of the positive electrode strip extending from the positive electrode strip winding end and has an outer portion extending one of continuously and intermittently on the outer surface of the positive electrode strip a greater distance than an inner portion of the insulating tape covering the inner side of the positive electrode strip. In an embodiment, the outer portion of the insulating tape continuously extends from the positive electrode strip winding end to a point radially aligned with the anode current collector. Alternatively, an auxiliary insulating tape is bonded to an inside surface of the outermost winding of the negative electrode strip in place of the above outer portion of the insulating tape.

7 Claims, 4 Drawing Sheets

NON-AQUEOUS ELECTROLYTE CELL

BACKGROUND OF THE INVENTION

The present invention relates to a non-aqueous electrolyte cell including an electrode assembly comprising a strip of negative electrode of light metal as active material, and a strip of positive electrode which are separated from each other by a separator and wound in a spiral, and a specific non-aqueous (organic) electrolyte which is stable with respect to the light metal.

Non-aqueous electrolyte cells including light metal such as lithium as active anode material and oxide or the like as active cathode material have various advantages over other primary cells such as having high voltage, high energy density with low self-discharge, and extremely long storage life, and the range of their applications has been increased with use particularly in advanced electronic appliances.

A typical type of such non-aqueous electrolyte cells has an electrode assembly comprising a strip of negative electrode and a strip of positive electrode which are separated by a separator and wound in a spiral. As shown in FIG. 6, which illustrates a development of the negative electrode in a final discharge state, an anode current collector 8 is connected to the negative electrode 3 close to a point opposite to a winding end 3a of the negative electrode 3. The electrode assembly is wound into a spiral with its negative electrode 3 located outside the positive electrode. The outermost winding of the negative electrode 3 thus has the positive electrode opposed thereto only on its inner side, separated therefrom by the separator. Accordingly, the active material of the negative electrode 3 in its outermost winding reacts with the positive electrode only on one side and is electrochemically consumed about a half as much as compared with other inner windings of the negative electrode 3 where the positive electrode opposes to the negative electrode at both sides. As a result, unreacted active anode material of light metal 3b remains even in the final discharge state as shown in FIG. 6. Particularly, the unreacted active light metal 3b remains in a greater amount between the anode current collector 8 and the winding end 3a of the negative electrode 3 and is partly electrically connected with the anode current collector 8.

When one of a plurality of cells connected in series in their final discharge states is replaced with a new one, the capacity of each cell is unbalanced and the cells are forced to discharge. In that case, since the anode material of active light metal 3b is electrically connected to the anode current collector 8 and still remains in the cell in its final discharge state, a component of active anode material is continuously deposited on the positive electrode by electrolysis, which may occasionally break the separator thus causing a short-circuit between the positive electrode and the negative electrode. Such an internal short-circuit allows a great amount of current to run therein, hence resulting in a sharp increase in temperature. Further, a spark generated when the short-circuit occurs may act as an ignition source and trigger combustion of the cell filled with gas.

The applicant has proposed an improved non-aqueous electrolyte cell capable of overcoming above described disadvantages even when the unreacted active light metal 3b remains in a used battery as disclosed in Japanese Published Unexamined Patent Application No. H5-13089. An arrangement of such a cell is illustrated in FIG. 5. A strip of positive electrode 2, having manganese dioxide as active cathode material and a strip of negative electrode 3, made of a lithium foil, are separated from each other by a separator 4 and wound in a spiral so that the negative electrode 3 comes to an outer side of the positive electrode 2, thus constituting an electrode assembly 1 which is accommodated in a cell housing 9.

In the electrode assembly 1, a winding end 3a of the negative electrode 3 is positioned within an angular range of 180 degrees extending from a winding end 2a of the positive electrode 2 in a direction opposite to a winding direction. In addition, an anode current collector 8 is provided at an inner winding of the negative electrode 3, closer to the spiral core than the end 3a of the negative electrode 3 and radially aligned therewith.

The end 2a of the positive electrode 2 is covered with an insulating tape 10 such as a piece of glass tape. This prevents any burr of the positive electrode 2 produced in cutting the end 2a from piercing the separator 4 to cause leakage.

In the above described non-aqueous electrolyte cell, active anode material of light metal 3b, which remains unreacted mostly in the outermost winding of the negative electrode 3 in the final discharge state, is parted from the anode current collector 8 thus preventing electrical connection there between. An end portion 2b of the positive electrode 2, between its end 2a and the end 3a of the negative electrode 3, is opposed to the negative electrode 3 only at its inner side, with which it reacts intensively, causing a rate controlling reaction in the negative electrode 3 adjacent the end portion 2b of the positive electrode 2. In the case that the cell is in its final discharge state and is forcibly discharged, the rate controlling reaction is further accelerated. Consequently, the remaining component of unreacted active anode material of light metal 3b is cut off by the rate controlling reaction along a one-dotted chain line P shown in FIG. 6, close to the anode current collector 8, and physically separated therefrom. Accordingly, the non-aqueous electrolyte cell of the above described prior art arrangement is capable of avoiding a short-circuit by preventing active anode material from being deposited on the positive electrode 2 by electrolysis even when the cell is forcibly discharged in the final discharge state.

However, the end portion 2b of the positive electrode 2 is specifically set to be as relatively short as 2 to 10 mm. In an actual practice, the electrode assembly 1 is produced on a large scale by winding the positive electrode 2 and the negative electrode 3 in strips separated by the separator 4 and superposed on each other in a spiral with an automatic winder machine. It is thus necessary to determine the overall lengths of the positive and negative electrodes 2, 3 as well as the mechanical precision of the automatic winder machine with extremely high accuracy in order to fabricate an electrode assembly 1 having a positive electrode end portion 2b of appropriate length. Even though these conditions are accurately set, it is hardly attainable to have all the electrode assemblies mechanically mass-produced with the end portion 2b of desired length due to variation in an initial setting at the spiral core or variation in stretch of the negative electrode 3 when wound. Thus it cannot be prevented that an electrode assembly 1 without the end portion 2b of the positive electrode 2 is produced, the end 3a of the negative electrode 3 extending to the end 2a of the positive electrode 2 as shown by a two-dotted chain line in FIG. 5, which results in a diminished yield of products.

BRIEF SUMMARY OF THE INVENTION

It is thus an object of the present invention to provide a non-aqueous electrolyte cell comprising an electrode assembly which can be mass-produced in an automatic winding process and capable of assuredly separating an active anode material component from an anode current collector, even when the cell in its final discharged state and is forcibly discharged.

To achieve the above object, a non-aqueous electrolyte cell according to a first feature of the present invention is characterized in that an anode current collector is disposed at an inner side of the negative electrode opposing a winding end of the positive electrode, and that an insulating tape, for protection of the end of the positive electrode, is provided having an outer portion extending continuously or intermittently on the outer side of the positive electrode longer in a direction toward the spiral core than an inner portion thereof covering the inner side of the positive electrode.

According to the present invention, the insulating tape for covering the end of the positive electrode extends from the end to the predetermined location along the outer side of the positive electrode. In case that the cell in its final discharge state is forcibly discharged, a part of the negative electrode opposing to the positive electrode covered by the insulating tape is physically separated from the anode current collector due to the rate controlling reaction which is partly accelerated therein. The anode current collector is disposed at an inner side with respect to the end of the positive electrode, thus causing the separation to occur in the vicinity of the anode current collector in the negative electrode, which ensures a complete separation of the outermost winding of the negative electrode where unreacted anode material is remained in great amount. Consequently, the electrodeposition of the anode material on the positive electrode will be prevented thus eliminating any troubles caused by a short-circuit between the positive and negative electrodes even when the electrode assembly having a mispositioned negative electrode extending up to or further than the end of the positive electrode is produced. This effect can be obtained with the use of a common insulating tape tailored to a desired shape with less cost.

Other and further objects, features and advantages of the invention will appear more fully from the following description.

DETAILED DESCRIPTION OF THE INVENTION

Figure 1:
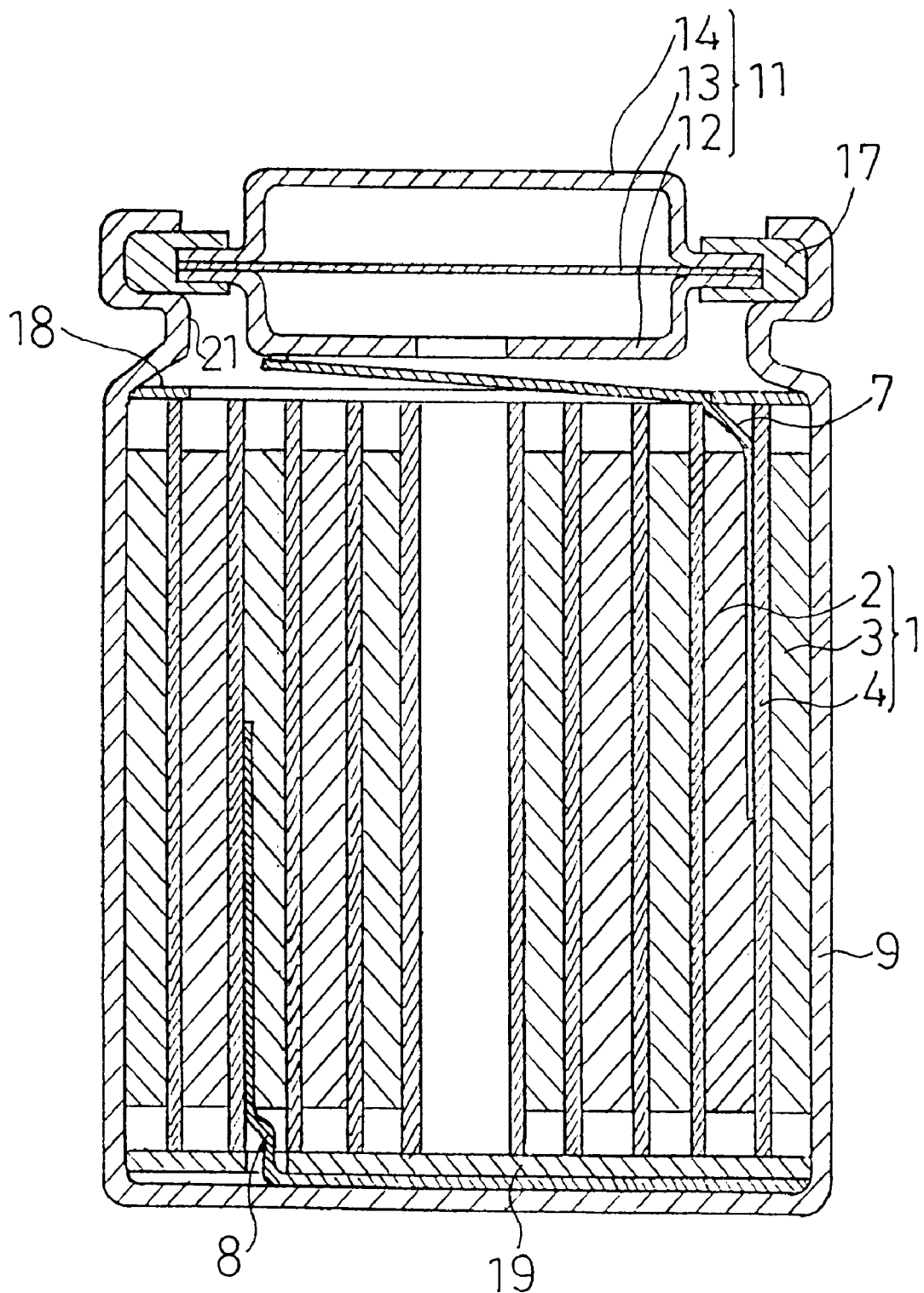
FIG. 1 is a longitudinal cross-sectional view of a non-aqueous electrolyte cell according to one embodiment of the present invention.
Figure 2:
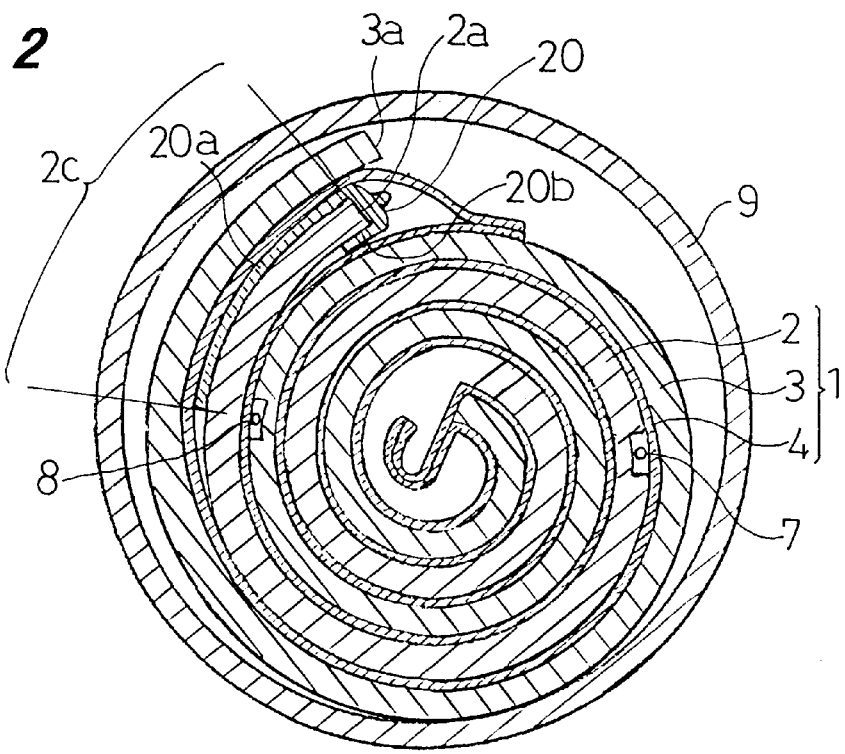
FIG. 2 is a transverse cross-sectional view thereof.
Figure 5:
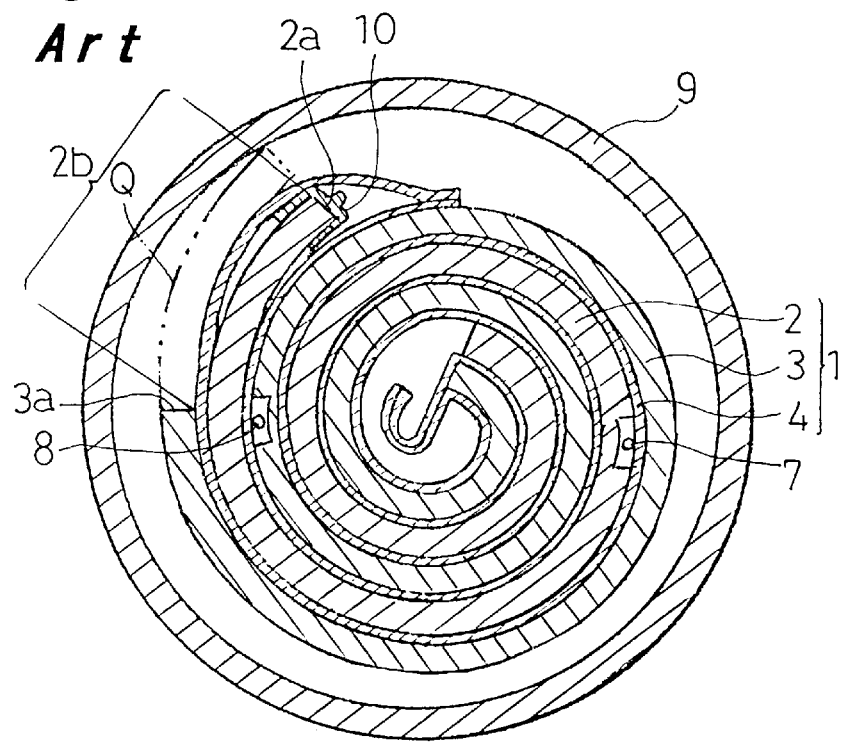
FIG. 5 is a transverse cross-sectional view of a conventional non-aqueous electrolyte cell.
Figure 6:
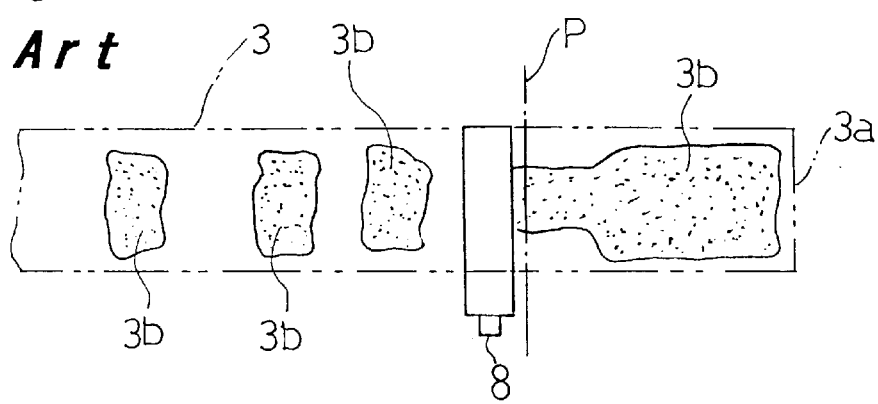
FIG. 6 is a development of a negative electrode explaining a final discharge state of the conventional cell.

Preferred embodiments of the present invention will be described referring to the accompanying drawings. FIG. 1 is a longitudinal cross-sectional view of a non-aqueous electrolyte cell according to an embodiment of the present invention, and FIG. 2 is a transverse cross-sectional view thereof. Parts same or similar to those previously described with respect to FIG. 5 are denoted by the same reference numerals, and the description thereof will be omitted. Referring to FIG. 1, a cylindrical cell housing 9 made of iron has a bottom as a negative terminal. An electrode assembly 1 is wound in a spiral and is submerged in a specific organic electrolyte (not shown) which is stable with respect to the light metal constituting active anode material in the cell housing 9. The upper opening of the cell housing 9 is hermetically sealed with a sealing member 11 caulked and fixed thereto via a packing 17. The sealing member 11 comprises a lower cover 12, a filmy valve 13, and an upper cover 14.

As shown in FIG. 2, the electrode assembly 1 is fabricated by winding a lamination of a strip of positive electrode 2 made of a metal mesh filled with manganese dioxide as active cathode material, a separator 4 made of a porous polypropylene film, and a strip of negative electrode 3 made of a lithium foil so that the negative electrode 3 is disposed outside the positive electrode 2. The electrode assembly 1 further includes a cathode current collector 7 provided to a part of the positive electrode 2 and an anode current collector 8 disposed in inner circles of the negative electrode 3 in the second round from the outermost periphery thereof.

The cathode current collector 7 is drawn upwardly from the positive electrode 2 through an insulating ring 18 toward the bottom of the lower cover 12 and joined thereto by resistance welding as shown in FIG. 1. The anode current collector 8 is drawn downwardly from the negative electrode 3 through an insulating plate 19, folded on the lower side of the electrode assembly 1 under the insulating plate 19, and joined by resistance welding to the bottom surface of the cell housing 9. Each of the cathode current collector 7 and the anode current collector 8 has two pieces of adhesive tape bonded on both sides thereof, though not shown. The positive electrode 2, the negative electrode 3, and the anode current collector 8 are 0.45 mm, 0.16 mm, and 0.1 mm in thickness, respectively.

The positive electrode 2 is fabricated by filling the metal mesh with slurryed manganese dioxide as active cathode material and drying it, and thus a burr is inevitably formed at its winding end 2a when trimmed. To prevent such a burr formed at the end 2a of the positive electrode 2 from piercing through the separator 4 which causes leakage, the end 2a of the positive electrode 2 is normally covered at both sides with a piece of insulating tape 20 such as glass or polypropylene tape. The insulating tape 20 in this embodiment is provided with its outer portion 20a which covers the outer side of the positive electrode 2 extending longer than its inner portion 20b covering the inner side of the same. The outer portion 20a, covering the outer side of the positive electrode 2, is set to have a length extending from the end 2a of the positive electrode 2 to a point substantially opposing to the anode current collector 8.

The above described non-aqueous electrolyte cell is fabricated in a manner described below. After the insulating tape 20 is bonded to the end 2a of the positive electrode 2, the positive and negative electrodes 2, 3 separated by the separator 4 are wound in a spiral, with the respective current collectors 7, 8 fixed at their corresponding positions with an automatic winder machine to build the electrode assembly 1 shown in FIG. 2. The electrode assembly 1 is accommodated in the cell housing 9 which is then filled with an organic electrolyte. The sealing member 11 is mounted to an inwardly projecting annular support 21 of the cell housing 9 and caulked with the packing 17 thereto by folding the edge of the cell housing 9 inwardly. The opening of the cell housing 9 is thereby hermetically sealed with the sealing member 11 to complete the cell.

In producing the electrode assembly 1, the end 3a of the negative electrode 3 is wound to locate within a range of 180 degrees from the end 2a of the positive electrode 2 in a reverse direction of winding, and the anode current collector 8 is mounted in an inner winding of the negative electrode 3 opposing to the end 3a thereof at its inner side but slightly shifted in the direction toward the spiral core. Since the lamination of the positive electrode 2, the separator 4, and the negative electrode 3 is wound by the automatic winder machine, the end 3a of the negative electrode 3 in the electrode assembly 1 may sometimes extend in the winding direction further than the end 2a of the positive electrode 2 as shown in FIG. 2, due to various reasons such as variation in initial setting at the spiral core.

Even though the electrode assembly 1 is fabricated to have such a configuration, the cell of this embodiment can obviate the above mentioned problem as hereinafter described, with the help of the insulating tape accurately bonded to the end 2a of the positive electrode 2. An end portion 2c, covered by the insulating tape 20 of the positive electrode 2 between its end 2a and a position opposing to the anode current collector 8, is electrically separated by the outer portion 20a of the insulating tape 20 from the outermost winding of the negative electrode 3, so as to cause the positive electrode 2 to face the negative electrode 3 only at an inner side thereof.

Figure 3:
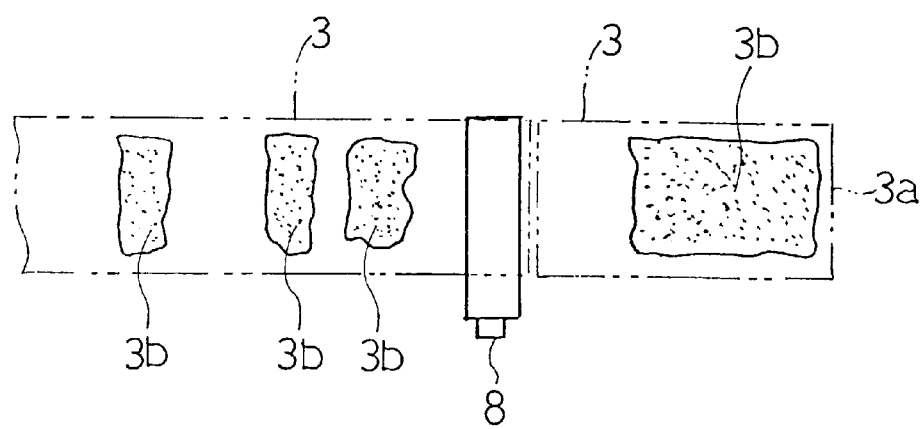
FIG. 3 is a development of a negative electrode explaining a final discharge state of the cell.

This allows the covered end portion 2c of the positive electrode 2 to react intensively with the negative electrode 3 at its inner side when the cell in its final discharge state is forcibly discharged. Accordingly, the rate controlling reaction is partly enhanced in the negative electrode 3 at the inner side of the covered end portion 2c of the positive electrode 2 between the vicinity of the anode current collector 8 and a point opposite to the end 2a of the positive electrode 2 which corresponds to the length of the outer portion 20a of the insulating tape 20. The active anode material 3b is thereby consumed in the regions of the covered end portion 2c to electrically disconnect a remainder of the anode material 3b from the anode current collector 8 as shown in FIG. 3. As the extreme velocity controlling reaction progresses, the negative electrode 3 is physically separated at a point slightly distanced from the anode current collector 8 in the winding direction to isolate the component of active light metal material 3b remaining unreacted in the outermost winding of the negative electrode 3 from the anode current collector 8. Therefore, deposition of the remaining active material of light metal 3b on the positive electrode 2 by electrolysis is prevented, eliminating troubles caused by a short-circuit between the positive electrode 2 and the negative electrode 3.

It is noted that the insulating tape 10 provided in the conventional non-aqueous electrolyte cell is rather short in length for covering only the tip of the end 2a of the positive electrode 2 as shown in FIG. 5 in such a way that it covers the end 2a from both sides with substantially the same length. The insulating tape 20 is of the same material as of the insulating tape 10, but only different in length and position, thus not being an additional member devised by the present invention. Instead of providing the insulating tape 20 as shown in FIG. 2 having longer outer portion 20a and shorter inner portion 20b over the end 2a of the positive electrode 2, another piece of tape may be provided somewhere between the end 2a and a point opposite to the anode current collector 8 in addition to the conventional tape covering only the tip of the positive electrode end 2a, by which the same effect as of this embodiment will be achieved.

Figure 4:
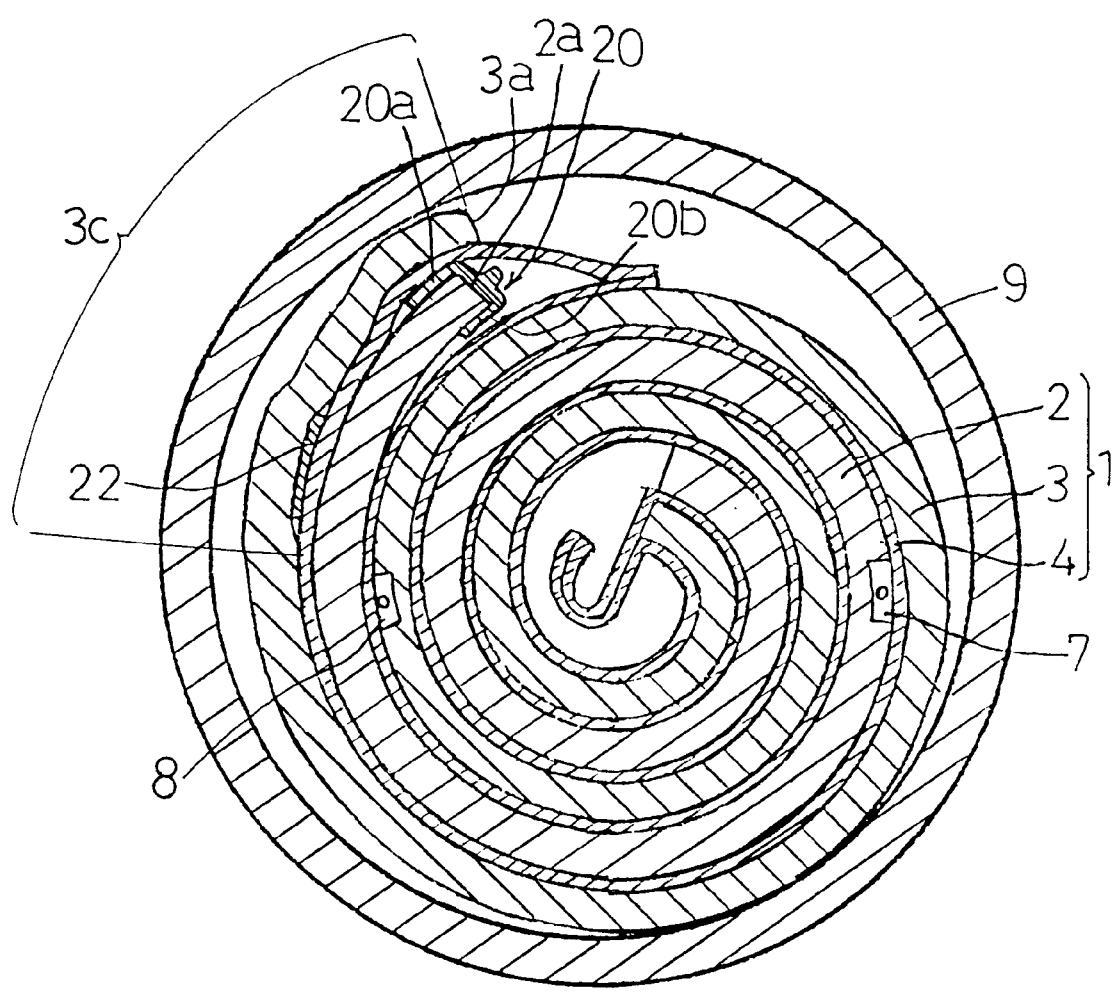
FIG. 4 is a transverse cross-sectional view of a non-aqueous electrolyte cell according to another embodiment of the present invention.

FIG. 4 is a transverse cross-sectional view of a non-aqueous electrolyte cell showing another embodiment of the present invention, in which parts same or similar to those previously described with respect to FIG. 2 are denoted by the same reference numerals, and a description thereof is omitted. The insulating tape 20 of this embodiment is short in length for covering the end 2a of the positive electrode 2 from both sides like the one shown in FIG. 5, and an auxiliary insulating tape 22, formed of material identical to that of the insulating tape 20 is additionally provided on the inner side of the outermost winding of the negative electrode 3 close to its end 3a.

Since the auxiliary insulating tape 22 is sandwiched between the inner side of the negative electrode 3 close to its end 3a and the outer side of the positive electrode 2 close to its end 2a, the part of the positive electrode 2 where the auxiliary insulating tape 22 electrically isolates it from the outermost winding of the negative electrode 3 opposes to the negative electrode 3 only at the inner side thereof. Accordingly, when the cell in its final discharge state is forcibly discharged, a part of the negative electrode 3, slightly off the anode current collector 8 in the winding direction, is separated due to the accelerated velocity controlling reaction therein. It is thus avoided that the remaining anode material is electrodeposited on the positive electrode 2, preventing troubles caused by a short-circuit between the positive electrode 2 and the negative electrode 3.

For achieving the above described effect, the auxiliary insulating tape 22 is bonded within a range of tape bonding portion 3c in the outermost winding of the negative electrode 3 between the end 3a and a point opposing to the anode current collector 8 but slightly forwarded in the winding direction. The auxiliary insulating tape 22 may be either bonded to the whole range 3c of tape bonding portion at the inner side of the negative electrode 3 or at least at one point within the range as shown in FIG. 4.

As set forth above, according to the non-aqueous electrolyte cell of a first embodiment of the present invention, the insulating tape for covering the end of the positive electrode extends from the end to the predetermined location along the outer side of the positive electrode. In the case that the cell in its final discharge state is forced to discharge, a part of the negative electrode opposing to the positive electrode covered by the insulating tape is physically separated from the anode current collector due to the rate controlling reaction which is partly accelerated therein. The anode current collector is disposed at an inner side with respect to the end of the positive electrode, thus causing the above said separation to occur in the vicinity of the anode current collector in the negative electrode, which ensures a complete separation of the outermost winding of the negative electrode, where unreacted anode material remains in great amount, from the anode current collector. Accordingly, the electrodeposition of the anode material on the positive electrode will be prevented thus eliminating any troubles caused by a short-circuit between the positive and negative electrodes, even when the electrode assembly having a mispositioned negative electrode extending up to or further than the end of the positive electrode is produced. This effect can be obtained with the use of a common insulating tape tailored to a desired shape with less cost.

The anode current collector is preferably disposed in the negative electrode closer to the spiral core than the end of the positive electrode, and the insulating tape is preferably provided on the outer side of the positive electrode extending from the end to substantially the point opposing to the anode current collector. This will ensure that the negative electrode is separated at a point slightly off the anode current collector in the winding direction, eliminating the remaining unreacted anode material from being electrically connected to the anode current collector and enhancing safety of the cell.

According to the non-aqueous electrolyte cell of a second embodiment of the present invention, the auxiliary insulating tape is provided on a part within the range on the inner side of the outermost winding of the negative electrode from the end to the point opposing to the anode current collector. The corresponding part of the positive electrode covered with the auxiliary insulating tape is electrically isolated from the outermost winding of the negative electrode and opposed to the negative electrode only at its inner side. Accordingly, in the case that the cell is forcibly discharged, the negative electrode is physically separated at a point slightly off the anode current collector in the winding direction due to the rate controlling reaction partly accelerated therein, thus avoiding the electrodeposition of the anode material on the positive electrode, preventing any troubles caused by a short-circuit between the positive and negative electrodes.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A non-aqueous electrolyte cell comprising:
   an electrode assembly including a negative electrode strip having a light metal as active anode material;
   a positive electrode strip having an active cathode material;
   a separator;
   the positive electrode strip and the negative electrode strip being superposed on each other with the separator therebetween and wound in a spiral;
   the negative electrode strip being disposed outside the positive electrode strip and having an outermost winding terminating at a negative electrode strip winding end, and a penultimate winding, and the positive electrode strip having an outermost winding terminating at a positive electrode strip winding end;
   an anode current collector contacting the negative electrode strip at a position on the penultimate winding thereof that is radially aligned with a portion of the positive electrode strip proximate the positive electrode strip winding end; and
   an insulating tape bonded to an inside surface and an outside surface of the positive electrode strip extending from the positive electrode strip winding end; and
   the insulating tape having an outer portion extending one of continuously and intermittently on the outer surface of the positive electrode strip from the positive electrode strip winding end a greater distance than an inner portion of the insulating tape covering the inner side of the positive electrode strip extends from the positive electrode strip winding end.

2. The non-aqueous electrolyte cell according to claim 1, wherein the outer portion of the insulating tape continuously extends from the positive electrode strip winding end to a point radially aligned with the anode current collector.

3. The non-aqueous electrolyte cell of claim 2 wherein the inner portion of the insulating tape bonded to the inside surface of the positive electrode strip extends a distance from the positive electrode strip winding end which does not reach a point radially aligned with the anode current collector.

4. The non-aqueous electrolyte cell of claim 1 wherein the inner portion of the insulating tape bonded to the inside surface of the positive electrode strip extends a distance from the positive electrode strip winding end which does not reach a point radially aligned with the anode current collector.

5. A non-aqueous electrolyte cell comprising:
   an electrode assembly including a negative electrode strip having a light metal as active anode materials;
   a positive electrode strip having an active cathode material;
   a separator;
   the positive electrode strip and the negative electrode strip being superposed on each other with the separator therebetween and wound in a spiral;
   the negative electrode strip being disposed outside the positive electrode strip and having an outermost winding terminating at a negative electrode strip winding end, and a penultimate winding, and the positive electrode strip having an outermost winding terminating at a positive electrode strip winding end;
   an anode current collector contacting the negative electrode strip at a position on the penultimate winding thereof that is radially aligned with a portion of the positive electrode strip proximate the positive electrode strip winding end;
   an insulating tape bonded to an inside surface and an outside surface of the positive electrode strip extending from the positive electrode strip winding end; and
   an auxiliary insulating tape bonded to an inside surface of the outermost winding of the negative electrode strip at least at a portion within a range between the negative electrode strip winding end and a point on the inside surface of the outermost winding of the negative electrode strip radially aligned with the anode current collector.

6. The non-aqueous electrolyte cell of claim 5 wherein the insulating tape bonded to the inside surface of the positive electrode strip extends a distance from the positive electrode strip winding end which does not reach a point radially aligned with the anode current collector.

7. The non-aqueous electrolyte cell according to claim 5, wherein the auxiliary insulating tape extends to a point radially aligned with the anode current collector.

* * * * *